US011949156B2

(12) United States Patent
Fernandez De La Fuente et al.

(10) Patent No.: US 11,949,156 B2
(45) Date of Patent: Apr. 2, 2024

(54) LONG RANGE LOW FREQUENCY ANTENNA

(71) Applicant: PREMO, S.A., Campanillas (ES)

(72) Inventors: Jose Ramon Fernandez De La Fuente, Atarfe (ES); Claudio Canete Cabeza, Benalmadena (ES); Antonio Rojas Cuevas, Malaga (ES); Francisco Ezequiel Navarro Perez, Barcelona (ES)

(73) Assignee: PREMO, S.L., Campanillas (ES)

( * ) Notice: Subject to any disclaimer, the term of this patent is extended or adjusted under 35 U.S.C. 154(b) by 501 days.

(21) Appl. No.: 17/318,439

(22) Filed: May 12, 2021

(65) Prior Publication Data

US 2021/0376476 A1 Dec. 2, 2021

(30) Foreign Application Priority Data

May 26, 2020 (EP) .................................... 20382441

(51) Int. Cl.

*H01Q 11/04* (2006.01)
*H01F 3/00* (2006.01)
*H01F 27/02* (2006.01)
*H01F 27/30* (2006.01)
*H01Q 1/32* (2006.01)

(Continued)

(52) U.S. Cl.

CPC ........... *H01Q 11/04* (2013.01); *H01F 27/022* (2013.01); *H01F 27/306* (2013.01); *H01Q 1/3241* (2013.01); *H01Q 7/06* (2013.01); *H01Q 7/08* (2013.01); *H01Q 11/08* (2013.01); *H01F 2003/005* (2013.01); *Y10T 428/32* (2015.01)

(58) Field of Classification Search

None

See application file for complete search history.

(56) References Cited

U.S. PATENT DOCUMENTS

| | | | | |
|---|---|---|---|---|
| 5,514,913 A | 5/1996 | Mangiagli et al. | | |
| 7,427,963 B2 * | 9/2008 | Moriya | H01Q 7/08 | 343/788 |

(Continued)

FOREIGN PATENT DOCUMENTS

| | | |
|---|---|---|
| EP | 0472199 A1 | 2/1992 |
| EP | 1450436 A1 | 8/2004 |
| JP | 2017103549 A | 6/2017 |

OTHER PUBLICATIONS

Abstract translation of CN 113927922 A (Year: 2022).*

*Primary Examiner* — Kevin M Bernatz

(74) *Attorney, Agent, or Firm* — LUCAS & MERCANTI, LLP

(57) ABSTRACT

A long range low frequency antenna having an elongated magnetic core; a coil surrounding the elongated magnetic core; a bobbin; where the elongated magnetic core is introduced in a cavity of the bobbin; and a housing overmolded on the bobbin in a waterproof manner. The antenna also comprises at least one damper located at one extreme of the elongated magnetic core. The at least one damper is made of an elastic and thermally-stable compound having a resin and a first filler including a natural mineral filler. Therefore, longitudinal dilatations, shrinkage, mechanical shocks, and vibrations of the elongated magnetic core are absorbed by the at least one damper, avoiding an impact over an inductance variation of the coil.

15 Claims, 3 Drawing Sheets

(51) Int. Cl.
*H01Q 7/06* (2006.01)
*H01Q 7/08* (2006.01)
*H01Q 11/08* (2006.01)

(56) References Cited

U.S. PATENT DOCUMENTS

| | | | | |
|---|---|---|---|---|
| 11,063,361 | B2 * | 7/2021 | Suzuki | H01Q 7/08 |
| 2002/0033777 | A1 * | 3/2002 | Maruyama | H01Q 1/40<br>343/788 |
| 2015/0116171 | A1 | 4/2015 | Koga et al. | |
| 2017/0062915 | A1 * | 3/2017 | Ando | H01Q 7/08 |
| 2017/0303030 | A1 * | 10/2017 | Parkins | H04R 1/1016 |
| 2018/0342895 | A1 | 11/2018 | Bae | |

* cited by examiner

LONG RANGE LOW FREQUENCY ANTENNA

CROSS REFERENCE TO RELATED APPLICATION

This application claims priority of European Patent Application No. 20382441.2 filed May 26, 2020, which is incorporated herein by reference.

TECHNICAL FIELD

The present invention belongs to the field of the magnetic inductors. In particular, the invention is directed, as a main purpose, to a long range low frequency antenna, in particular an emitter antenna.

The proposed long range low frequency antenna of this invention is of particular relevance in the field of keyless entry systems (KES) (also known as Passive Keyless Entry (PKE)) and also in other LF communication systems.

Low frequency RFID communication systems always work by using a power system that generates a high magnetic field in an emitter or transmitter (TX) antenna connected to a power source (battery or network) and a tag or passive system that has a receiving antenna (RX) that is very sensitive to small fields and that energizes the tag's electronics to activate the response functions.

The TX antennas for 1D and hybrid systems can be characterized as follows:

- They must emit high intensity fields H.
- They must withstand high currents.
- They usually work in resonant mode at the operating frequency or resonant frequency in combination with a local capacitor (at the antenna) or central capacitor (at the ECU).
- To avoid saturating the ferromagnetic core there is a maximum value of N×I (number of turns per current) that determines a threshold of magnetic saturation B1sat and that makes these antennas having a low number of turns and low inductance (in the order of 100 uH to 800 uH).
- The winding is therefore usually a thick wire of the order of 0.1 to 1 mm in diameter, with few turns (80 to 150) and one layer.
- They are physically large (from 50 to 500 mm) and are classified into 3 groups according to their length and range:
  - Short Range (50 to 100 mm), reading range 1-2 meters.
  - Mid-Range (100 to 200 mm), reading range 1.5-3 meters.
  - Long Range (200 mm to 500 mm), reading range >3 meters.

The quality factor and sensitivity are not critical parameters in this type of antennas. Likewise, they are usually unidirectional, and the ratio LID (length/diameter) (or equivalent diameter in case of square or rectangular shapes) is very high (typically larger than 10) to maximize the effect of effective magnetic permeability in the core. The specific shape of the ferrite core (although it can also be made from any other soft magnetic material such as nanocristalline, amorphous metals or PBM) is also intended to maximize the inductance, sensitivity and range of the antenna.

BACKGROUND OF THE INVENTION

JP2017103549 A1 discloses an antenna device with a built-in connector and a method of manufacturing the antenna device that can prevent the electronic component from being displaced when soldering the electronic component.

EP1450436 B1 discloses a transmission antenna, comprising an antenna coil wound on a ferrite core; a capacitor connected with the antenna coil to form a serial resonance circuit; a small ferrite core having a screw shape and the cross-section area of the small core is smaller than that of the ferrite core; a non-magnetic distance adjuster mated to one of lengthwise ends of the ferrite core and magnetically joining the small core to the ferrite core; a hole formed in the distance adjuster, the small core being arranged in the hole in a mobile fashion to adjust the distance between the ferrite core and the small core; and a case which houses the antenna coil, the ferrite core, the small core, the distance adjuster, and the capacitor, wherein the distance between the ferrite core and the small core is adjusted so that the resonance frequency of the serial resonance circuit is set to a desired value.

US2015116171 A1, refers to a bar antenna comprising a bar core configured to connect at least two of core pieces in series; a bobbin covering at least a portion of the bar core; a winding wound in a predetermined range of the bobbin; and a case having the bar core and the bobbin disposed therein, wherein the bar core and the bobbin are sealed by filling in the case with a potting material, and the bar core is configured to be bendable with respect to a predetermined external force at a connection portion of the at least two of core pieces.

US20180342895 A1 discloses a bar-shaped inductive component with a core made from magnetic material and a mounting element for the core, the core being divided into a series of individual magnetic cores that are arranged and fixed relative to one another by means of the holding element in such a way that the ends of the series of individual cores adjoining one another overlap, and wherein the series of the individual cores are offset relative to one another in at least two layers.

The solution proposed in US20180342895 A1 tries to avoid the leakage of magnetic flux that occurs in the gaps between individual magnetic cores by rechanneling them by zigzagging or staggering pieces. This produces rigidity, and the quality factor Q is low as the effective permeability of a set of cores is lower than that of a single core and without gaps. It also has the disadvantage that the height of the bar-shaped inductive component is doubled. On the other hand, the antenna is resistant to impacts.

Other known solutions consist of cylindrical magnetic core elements compressed by a spring or that use protected and encapsulated amorphous or nanocristalline materials.

It has been found that the known antennas have a constant cross sectional area along the magnetic core, and in order to provide a long range antenna the magnetic core is built by assembling several pieces of smaller cores together.

This is because the manufacture of long cores is complex because of the "banana effect". This consists of a deformation by curvature of the ferrites and ceramics when they pass the firing or sintering process at high temperature if there are big differences in the magnitudes of the pieces. Ideally, a sphere or a cube does not have this effect, but the greater the difference in dimensions in the X, Y and Z axes, the greater the difference in shrinkage forces that are produced by sintering. These are deformed and irregular pieces with curves that resemble a banana, hence the Anglo-Saxon name "banana effect".

The ferrites that are much longer than wide and high, in which the Y/X ratio can be 5 to 12 times, are very fragile and their thermal variations produce greater elongations on the longest axis, i.e. the Y-axis.

The elongations by dilation in the Y axis produce compressions in the axis that affect the magnetic permeability of the ferrite and therefore the inductance L of the antenna, producing deviations in the resonance frequency of the LC tank. This in practice reduces the range of the antenna and can make it directly inoperable due to resonance frequency deviation.

The same anisotropy effect is produced by low temperature contractions which are much more pronounced in the Y-axis and which produce deviations of opposite signs with the same undesired effects.

These unwanted effects, i.e., shape or dimension changes during magnetization, occur in all ferrite and ferromagnetic materials and are known as the magnetostriction effect.

DESCRIPTION OF THE INVENTION

An object of the present invention is thus to provide a long range low frequency antenna with high mechanical reliability, thermal stability, long range and shock impact resistance.

To this end, present invention proposes the use of elongated, rigid antennas/inductors, which comprise a core composed of one, and in some cases, optionally two or more elements or rigid ferromagnetic cores connected in a joint manner by their ends, forming a rigid assembly but capable of absorbing falls and vibrations without risk for the integrity of the inductor.

By "elongated inductor" is understood, in the context of this invention, an inductor formed by a simple or composite magnetic core whose L/D ratio, (i.e. length to diameter) is between 30 and 45. The (hydraulic) diameter being equivalent in the case of a rectangular section of the core (according to Huebscher):

$$d_e=1.30(ab)^{0.625}/(a+b)^{0.25}$$

with a and b being the sides of the rectangle.

TABLE 1

| L | a | b | $d_e$ | L/D | $\mu_{rod}$ | Range | Core |
|---|---|---|---|---|---|---|---|
| 70 | 7 | 3 | 4.90 | 14.28 | 115 | Short range | Rigid |
| 120 | 8 | 4 | 6.09 | 19.69 | 180 | Mid-Range | Rigid |
| 150 | 10 | 4 | 6.74 | 22.25 | 190 | Mid-Range | Rigid |
| 250 | 12 | 4 | 7.31 | 34.22 | 390 | Long-range | Rigid/Flex |
| 300 | 17 | 3 | 7.18 | 41.80 | 500 | Long-range | Rigid/Flex |
| 500 | 17 | 3 | 7.18 | 69.67 | 1100 | Ultra-long-range | Flex |

$\mu_{rod}$ for $3000<\mu i<4000$ (effective permeability for a core material of initial permeability between 3000 and 4000), $$L=\mu_0\mu_{rod}\frac{N^2A}{l}(H)$$

where:

L: Inductance (Henry's)

$\mu_0$: Magnetic permeability of vacuum: $4\pi10^{-7}$ N/A$^2$

Prod: Effective permeability

N: Number of turns

A: Cross section

L: Length

Table 1 shows the influence on the final inductance based on the core LID ratio and FIG. 3, shows how susceptible the inductance variation can be due to the variation of the effective permeability. As can be seen, the variation of the effective permeability is logarithmic versus the UD ratio for a given magnetic material.

The object of this invention is fulfilled by an antenna with the characteristics of claim 1.

In an embodiment, the proposed long range low frequency antenna, or inductor, comprises an elongated magnetic core, particularly stiff; a coil surrounding the elongated magnetic core; a bobbin; the elongated magnetic core being introduced in a cavity of said bobbin; and a housing overmolded on the bobbin in a waterproof manner.

The proposed antenna also comprises a damper located at one end of the elongated magnetic core. Particularly, the damper is made of an elastic and thermally stable compound that comprises a resin and a first filler formed by a natural mineral filler.

Therefore, longitudinal dilatations, shrinkage, mechanical shocks, and vibrations of the elongated magnetic core are absorbed by the damper, avoiding an impact over the inductance variation of the coil. The proposed solution prevents the elongated magnetic core from breaking and also prevents it from generating a variation in the inductance of the coil if it cracks.

In an embodiment, the elongated magnetic core is made of several elongated magnetic cores portions that are butt to butt connected with each other. The butt to butt connections can also include different self-adhesive ferromagnetic sheets stiffeners. Moreover, elastic annular holders surrounding the elongated magnetic core portions along several different areas can be also provided.

In an embodiment, the antenna has two dampers each one being located against an extreme of the elongated magnetic core. Alternatively, the antenna comprises several dampers located either continuously or discretely against the walls of the elongated magnetic core.

In some embodiments, the antenna can also comprise a damper that fully covers the elongated magnetic core, so providing a casing for the latter.

According to the invention, the natural mineral filler can comprise quartz, quartzite, marble, sand and/or calcium carbonate, which can be finely divided. The first filler can be included or present in the elastic and thermally-stable compound in a proportion between 50 and 90%. In some embodiment, the natural mineral filler can comprise two or more different fillers of diverse granulometry.

In an embodiment, the elastic and thermally-stable compound also includes a second filler comprising a given amount of aluminum hydroxide. For example, the given amount of the aluminum hydroxide can be comprised in the range of 1 and 5% by weight with regard to the total weight of the elastic and thermally-stable compound.

In an embodiment, the elongated magnetic core has a length between 200-500 mm.

In an embodiment, the bobbin is made of two independent hollow parts that are configured to engage with each other via a plurality of inter-connecting features formed on an edge of each part. Alternatively, the bobbin is made of a single part with a through hole formed on at least one extreme of the bobbin to facilitate the introduction of the elongated ferrite magnetic core. Particularly, the outer lateral wall of the bobbin is engraved with grooves or includes slots through which wires of the coil of the elongated magnetic core are positioned.

The overmoulding of the housing on the bobbin can be made, for example, by injecting a thermoplastic material able to harden into a mould, so as to form a leak tight shell.

Known techniques can be employed to perform the overmoulding, for example the ones disclosed in EP 472199A1, U.S. Pat. No. 5,514,913 (use of retractable positioning pins holding the housing in the mould) or enclosing the housing into a flexible envelope or shell capable to deform while the thermoplastic material hardens, among others.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF PREFERRED EMBODIMENTS

Figure 1:
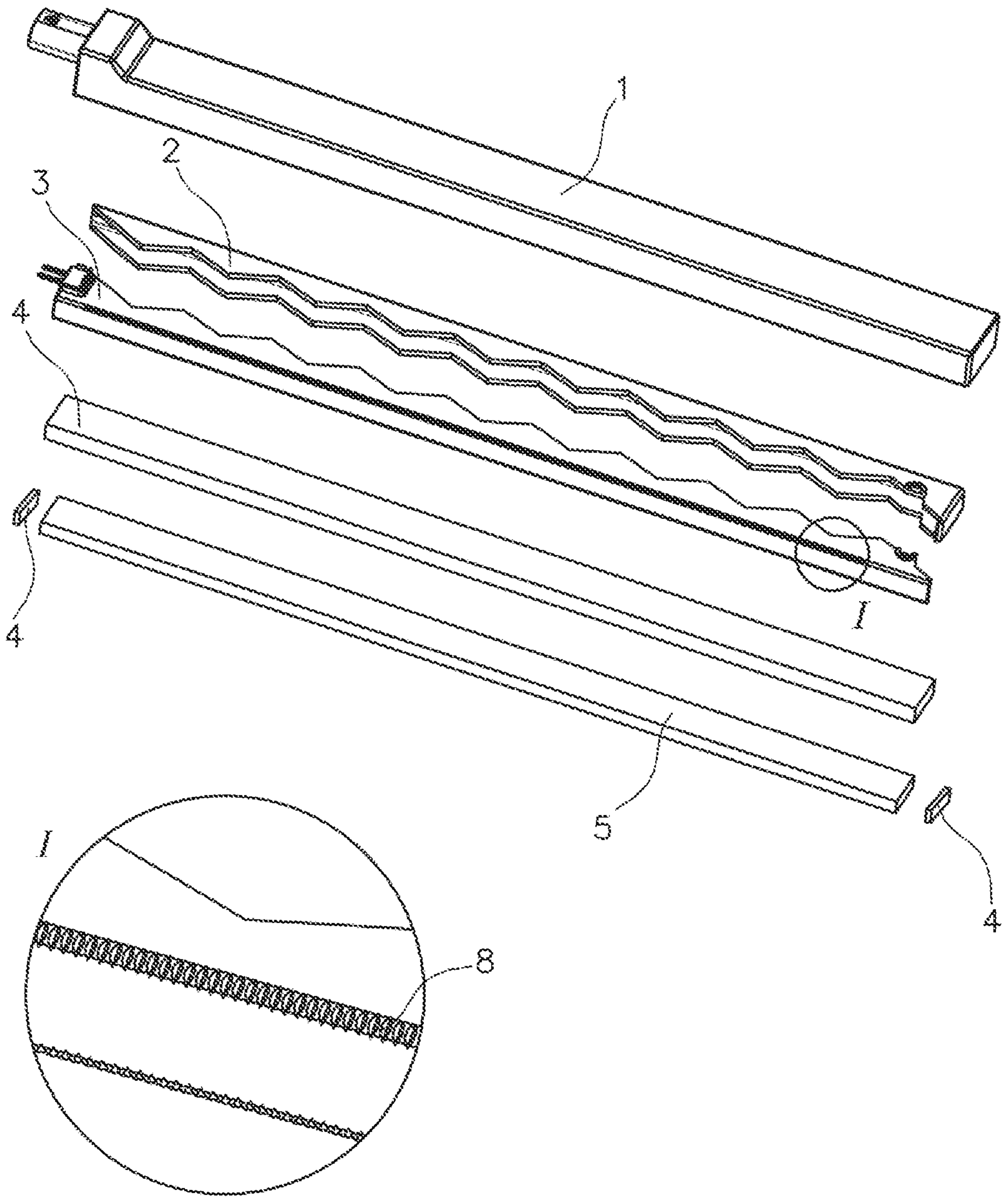
FIG. 1 is an exploded view of the components that constitute the proposed long range frequency antenna, according to an embodiment of the present invention.

With reference to FIG. 1, therein it is illustrated an embodiment of the proposed long range frequency antenna (hereinafter referred as antenna). According to this embodiment, the antenna comprises a housing 1, a bobbin 2, 3 made of two independent hollow parts (i.e. like a sandwich structure) that are configured to engage with each other via triangular-shaped inter-connecting features formed on an edge of each part 2, 3; a monolithic elongated magnetic core 5; and damping elements 4.

The elongated magnetic core 5 can be manufactured by means of a manufacturing process of a volume of pressed (>300 T) and sintered magnetic material, through the application of a progressive cutting process, thus avoiding the "banana effects" and the waste that would occur in a normal manufacturing process of this type of cores.

The elongated magnetic core 5 is particularly formed by a soft-magnetic material. The core is a parallelepiped of ferrite (typically MnZn), large in length (particularly between 200-500 mm.), but small in width and minimum in thickness to avoid the "banana effect" from the sintering process.

In an embodiment, the elongated magnetic core 5 is obtained by: obtaining a block via pressing and sintering processes; encapsulating the super-block by means of an adhesive element and a metallic support disposed in one of its sides; cutting the super-block in elongated blocks of a desired size. Cutting can be done by a slow and precise operation with a diamond blade, controlling at all times depth of cut, penetration and abrasion of the ferrite. The whole process is cooled with cooling liquid and monitored. The encapsulation of the super-block allows the cuts to be made at the same time, without losing the positioning of the remaining part once an elongated piece has been cut. Once the elongated magnetic core 5 is available, a design and final assembly process is configured, as well as the selection of materials in direct or close contact with the ferrite to ensure a minimum variation (<5%).

Referring back to FIG. 1, the elongated magnetic core 5 receives a coil 8 (see enlarged view I) wound around the same. The coil 8 is particularly made of a wire of ferromagnetic material, and is positioned along grooves or slots engraved or included in an outer lateral wall of the bobbin 2, 3. The grooves or slots permit a self-adjustable attachment of the wire of the coil 8 and facilitate that the wire do not move sideways during manufacturing or stress processes.

To assemble the different components of the antenna of FIG. 1, in an embodiment, one damping element, or damper, 4 is placed at each extreme of the elongated magnetic core 5 and one damper 4 is placed to fully cover the elongated magnetic core 5. The elongated magnetic core 5 is then introduced inside the cavity of the bobbin 2, 3, engaging the wires of the coil 8 along the cited grooves or slots. Once the bobbin 2, 3 is closed the housing 1 is overmolded on the bobbin 2, 3 in a waterproof manner.

It should be noted that in other embodiments, in this case not illustrated, the proposed antenna comprises a single damper 4 located at one extreme of the elongated magnetic core 5 only. The proposed antenna can also comprise numerous dampers 4 located against the lateral, upper and/or bottom walls of the elongated magnetic core 5. The different dampers can be positioned either continuously from each other or discreetly.

The damper/s 4 is/are made of an elastic and thermally-stable compound, particularly of a resin, for example based on siloxanes or silicones, and a natural mineral filler, for example quartz, quartzite, marble, sand, calcium carbonate, among others, particularly finely divided. The compound has a combined hardness and coefficient of expansion that minimizes or reduces to 0 the fatigue or pressure on the elongated magnetic core 5 under conditions of typical temperature variations from −40° C. to 85° C. This means that the so-called "Vilary" effect (inverse effect to Joule's magnetostriction) does not occur. Hence, by including the damper/s 4 in the proposed antenna, longitudinal dilatations, shrinkage, mechanical shocks, and vibrations of the elongated magnetic core 5 can be absorbed, thus avoiding an impact over the inductance variation of the coil 8.

The proportion of said first filler in the elastic and thermally-stable compound can vary between 50 and 90%. In some embodiments, it is planned to use different natural mineral fillers with diverse granulometries.

In some embodiments, the elastic and thermally-stable compound can further include a second filler made of a given amount of aluminum hydroxide or its derivatives. The given amount of the aluminum hydroxide can be comprised in the range of 1-5% by weight with regard to the total weight of the elastic and thermally-stable compound including the resin.

In some embodiments, the housing 1 can be overmolded by way of the HPM technique. That is, an integral overmoulding with dynamic holders of the bobbin that allows that there is no pore since in the last phase of the injection of thermostable polymer with glass fibre load, normally PA66 or PBT, the supports are removed in a dynamic way and the bobbin floats on the casting, leaving no point of support. So mechanical rigidity, impact resistance and total waterproof of the housing is granted.

Figure 2:
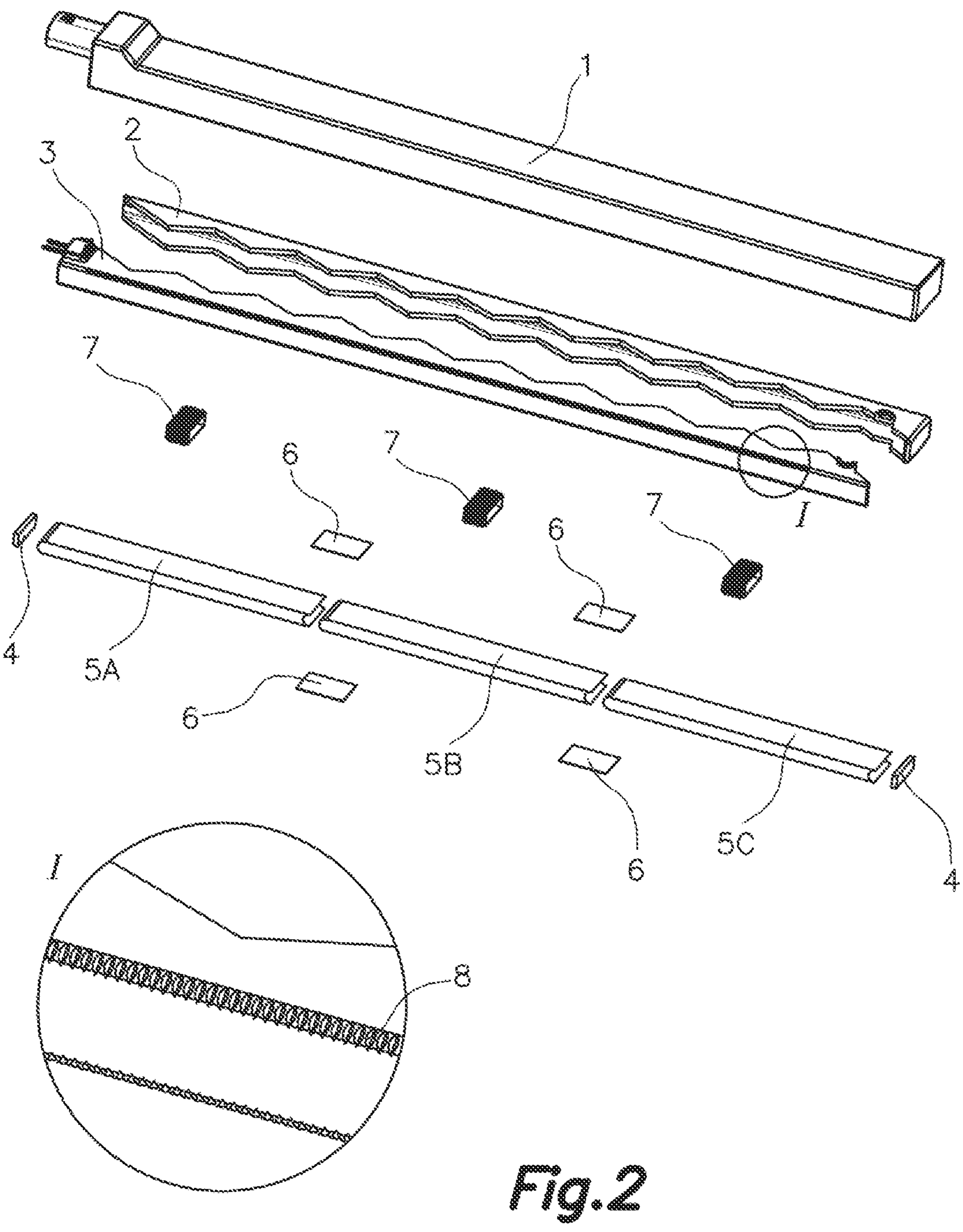
FIG. 2 is an exploded view of the components that constitute the proposed long range frequency antenna, according to another embodiment of the present invention.
Figure 3:
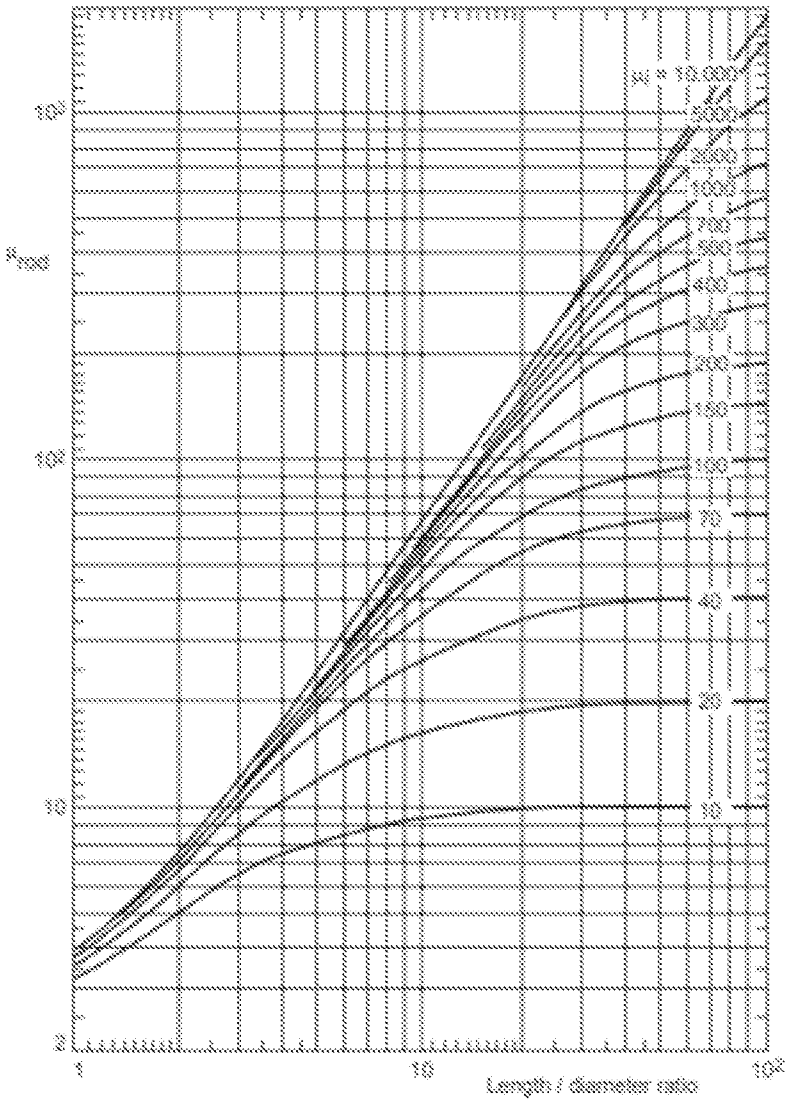
FIG. 3 is a graph showing how susceptible the inductance variation can be due to the variation of the effective permeability.

With reference to FIG. 2, therein it is illustrated another embodiment of the proposed antenna. Unlike the embodiment of FIG. 1, in this case the elongated magnetic core 5 comprises a plurality of elongated magnetic cores portions 5A, 5B, 5C that are butt to butt connected. Moreover, the antenna comprises two dampers 4, one for each extreme of the elongated magnetic core 5.

Each portion 5A, 5B, 5C has a curved design (concave-convex) at its ends. This curved design provides a double functionality, on the one hand it reduces the susceptibility to impact and falls and on the other hand it provides a greater contact surface between these portions, without the need to add structural glue that would increase the risk of breakage against falls and bending.

The connection of the portions 5A, 5B, 5C includes self-adhesive ferromagnetic sheets stiffeners 6, with a thickness between 0.1 and 0.4 mm, and an initial permeability higher than 200, which have a double effect, firstly to minimize the variation of the elongated magnetic core permeability and secondly to avoid the reduction of the quality factor (Q) and the inductance. Likewise, to achieve mechanical insulation between the elongated magnetic core 5 and the bobbin 2, 3 two or more elastic annular (e.g. ring-shaped) holders/members 7 are also included, for example made of silicone rubber or of a viscoelastic material, with low hardness, that act as an absorber against external vibrations, drops and bending.

In some embodiments, in this case not illustrated, the bobbin is made of a single part and includes a through hole on at least one lateral extreme thereof to facilitate the introduction of the elongated ferrite magnetic core 5.

Unless otherwise indicated, all numbers expressing measurements, conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed patent matter.

As used herein, the term "about", when referring to a value or to an amount of a length, width, concentration, percentage, etc., is meant to encompass variations of in some embodiments ±10%, or in some embodiments ±5%, from the specified amount, as such variations are appropriate to perform the disclosed antenna.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The scope of the present invention is defined in the following set of claims.

The invention claimed is:

1. A long range low frequency antenna, comprising:

an elongated magnetic core;

a coil surrounding the elongated magnetic core;

a bobbin;

the elongated magnetic core introduced in a cavity of the bobbin;

a housing overmolded on the bobbin in a waterproof manner;

at least one damper located at one extreme of the elongated magnetic core, the at least one damper made of an elastic and thermally-stable compound comprising a resin and a first filler including a natural mineral filler, whereby longitudinal dilatations, shrinkage, mechanical shocks, and vibrations of the elongated magnetic core are absorbed by the at least one damper, avoiding an impact over an inductance variation of the coil.

2. The long range low frequency antenna of claim 1, comprising two dampers each one being located against an extreme of the elongated magnetic core.

3. The long range frequency antenna of claim 1, comprising a plurality of dampers located, continuously or discretely, against the elongated magnetic core.

4. The long range low frequency antenna of claim 1, further comprising one damper fully covering the elongated magnetic core, providing a casing.

5. The long range low frequency antenna of claim 1, wherein the natural mineral filler comprises quartz, quartzite, marble, sand and/or calcium carbonate, preferably finely divided.

6. The long range low frequency antenna of claim 1, wherein the elastic and thermally-stable compound further comprises a second filler including a given amount of aluminum hydroxide.

7. The long range low frequency antenna of claim 1, wherein the elongated magnetic core has a length comprised in a range between 200-500 mm.

8. The long range low frequency antenna of claim 1, wherein the elongated magnetic core is made of a plurality of elongated magnetic cores portions butt to butt connected.

9. The long range low frequency antenna of claim 8, wherein each butt to butt connection includes a plurality of self-adhesive ferromagnetic sheets stiffeners.

10. The long range low frequency antenna of claim 8, further comprising a plurality of elastic annular holders surrounding the elongated magnetic core portions along several different areas.

11. The long range low frequency antenna of claim 1, wherein the bobbin comprises two independent hollow parts that are configured to engage with each other via a plurality of inter-connecting features formed on an edge of each part.

12. The long range low frequency antenna of claim 1, wherein the bobbin comprises a single part with a through hole formed on at least one extreme of the bobbin to facilitate the introduction of the elongated ferrite magnetic core.

13. The long range low frequency antenna of claim 11, wherein an outer lateral wall of the bobbin is engraved with grooves or includes slots through which wires of the coil of the elongated magnetic core are positioned.

14. The long range low frequency antenna of claim 1, wherein the natural mineral filler comprises two or more different fillers of diverse granulometry.

15. The long range low frequency antenna of claim 1, wherein the proportion in the elastic and thermally-stable compound of the first filler is between 50 and 90%.

* * * * *